(12) United States Patent
Yamane et al.

(10) Patent No.: US 9,163,708 B2
(45) Date of Patent: Oct. 20, 2015

(54) CONTINUOUSLY VARIABLE TRANSMISSION

(71) Applicant: JTEKT CORPORATION, Osaka-shi, Osaka (JP)

(72) Inventors: Shinji Yamane, Kashiba (JP); Keisuke Mori, Yamatokoriyama (JP); Teruhiko Nakazawa, Nagoya (JP); Haruhiro Hattori, Nisshin (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/212,374

(22) Filed: Mar. 14, 2014

(65) Prior Publication Data
US 2014/0287854 A1 Sep. 25, 2014

(30) Foreign Application Priority Data

Mar. 22, 2013 (JP) ................................ 2013-060414

(51) Int. Cl.
*F16H 55/56* (2006.01)
*F16H 9/18* (2006.01)
*F16H 55/36* (2006.01)

(52) U.S. Cl.
CPC .................. *F16H 9/18* (2013.01); *F16H 55/56* (2013.01); *F16H 2055/366* (2013.01)

(58) Field of Classification Search
CPC ..... F16H 55/56; F16H 9/18; F16H 61/66272; F16H 9/24; F16G 5/18
USPC ............................................................. 474/8
See application file for complete search history.

(56) References Cited

U.S. PATENT DOCUMENTS

| | | | | |
|---|---|---|---|---|
| 1,637,402 A | * | 8/1927 | Abbott | 474/43 |
| 3,494,212 A | * | 2/1970 | Thomson | 474/178 |
| 3,534,622 A | * | 10/1970 | Johnson | 474/12 |
| 5,013,283 A | * | 5/1991 | d'Herripon | 474/8 |
| 6,017,285 A | * | 1/2000 | Yasuhara et al. | 474/12 |
| 6,106,422 A | * | 8/2000 | Arai | 474/100 |
| 6,123,634 A | * | 9/2000 | Faust et al. | 474/8 |
| 6,129,643 A | * | 10/2000 | Tamagawa et al. | 474/8 |
| 6,478,701 B1 | * | 11/2002 | Yasuhara et al. | 474/12 |
| 6,506,136 B2 | * | 1/2003 | Schmid et al. | 474/18 |
| 6,585,615 B2 | * | 7/2003 | Uota | 474/242 |

(Continued)

FOREIGN PATENT DOCUMENTS

| | | |
|---|---|---|
| DE | 43 42 736 A1 | 6/1995 |
| DE | 100 22 846 A1 | 11/2000 |
| JP | A-63-115966 | 5/1988 |

OTHER PUBLICATIONS

Extended European Search Report issued in European Application No. 14160634.3 issued Jun. 10, 2014.

*Primary Examiner* — Henry Liu
(74) *Attorney, Agent, or Firm* — Oliff PLC

(57) ABSTRACT

A chain (endless flexible member) is looped over an input pulley and an output pulley. Each of the input pulley and the output pulley includes a pair of a fixed sheave and a movable sheave. The fixed sheave and the movable sheave have tapered faces that are opposed to each other to define a V-shaped groove. A vibration damping plate (vibration damping member) is fixed to each fixed sheave, and is in contact with the outer peripheral face of the fixed sheave. When the fixed sheave vibrates, the vibrations are damped by the friction between the outer peripheral face of the fixed shave and the vibration damping plate.

16 Claims, 5 Drawing Sheets

(56) References Cited

U.S. PATENT DOCUMENTS

| | | | |
|---|---|---|---|
| 6,648,781 B1 * | 11/2003 | Fischer et al. | 474/8 |
| 7,241,238 B2 * | 7/2007 | Gieles | 474/18 |
| 7,798,930 B2 * | 9/2010 | Nojiri | 474/93 |
| 8,506,432 B2 * | 8/2013 | Yamaguchi et al. | 474/8 |
| 2008/0125257 A1 * | 5/2008 | Ishida | 474/14 |

* cited by examiner

CONTINUOUSLY VARIABLE TRANSMISSION

INCORPORATION BY REFERENCE

The disclosure of Japanese Patent Application No. 2013-060414 filed on Mar. 22, 2013 including the specification, drawings and abstract is incorporated herein by reference in its entirety.

BACKGROUND OF THE INVENTION

1. Field of the Invention

The invention relates generally to a continuously variable transmission including two pulleys each having a V-shaped groove with a variable width and an endless flexible member looped over the two pulleys, and more specifically to the structure of the continuously variable transmission.

2. Description of Related Art

There is a conventional continuously variable transmission including two pulleys each having a V-shaped groove with a variable width and an endless flexible member, such as a belt or a chain, which is looped over the two pulleys. Each of the pulleys has a pair of sheaves each having a tapered face, and the tapered faces of the sheaves are opposed to each other to define a V-shaped groove. The endless flexible member is looped over the two pulleys so as to be fitted in the V-shaped grooves of the pulleys. Thus, the rotation of one of the pulleys is transmitted to the other one of the pulleys via the endless flexible member.

By moving the sheaves in each pair relative to each other to vary the distance between the sheaves, the width of each V-shaped groove is varied. By varying the width of each V-shaped groove, the running radii of the circles of rotation of the endless flexible member looped over the pulleys are varied. As a result, the speed ratio between the two pulleys is varied. By allowing the relative distance between the sheaves in each pair to take a continuous value, the speed ratio between the two pulleys is continuously varied, that is, the speed ratio between the two pulleys is varied in a stepless manner.

Japanese Patent Application Publication No. 63-115966 (JP 63-115966 A) describes the pulley structure of a continuously variable transmission in which an endless flexible member (V-belt (3)) is used. The pulley structure includes a vibration suppression member (7) or (18) that is provided on a face of one of sheaves, the face being on the opposite side of the sheave from its tapered face, to suppress vibrations of the sheave (pulley half (4)) (refer to the description from line 16 in the lower left column to line 1 in the lower right column on page 2, and the description from line 9 to line 13 in the upper right column on page 4). The vibrations of the sheave are suppressed by the action of friction between the sheave and the vibration suppression member (refer to the description from line 13 to line 16 in lower right column on page 3 and the description from line 10 to line 16 in the lower left column on page 4). Note that the reference numerals within parentheses described above are used in JP 63-115966 A, and are not related to the reference numerals that will be used in the embodiments of the invention.

In the pulley structure described in JP 63-115966 A, when the sheave vibrates, there is a possibility that the amplitude of vibration at a portion of the sheave, on which a frictional force acts, will not be large and therefore a sufficient vibration damping effect will not be obtained.

SUMMARY OF THE INVENTION

One object of the invention is to effectively suppress vibrations of sheaves of a continuously variable transmission.

An aspect of the invention relates to a continuously variable transmission including two pulleys each having a rotary shaft and a pair of sheaves with tapered faces that are opposed to each other to define a V-shaped groove and an endless flexible member looped over the two pulleys, the continuously variable transmission varying a transmission ratio between the pulleys by varying a distance between the sheaves in each pair. The continuously variable transmission includes a vibration damping member that is in contact, under pressure, with an outer peripheral face of the sheave to which the vibration damping member is fitted. At least one of the sheaves is provided with the vibration damping member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
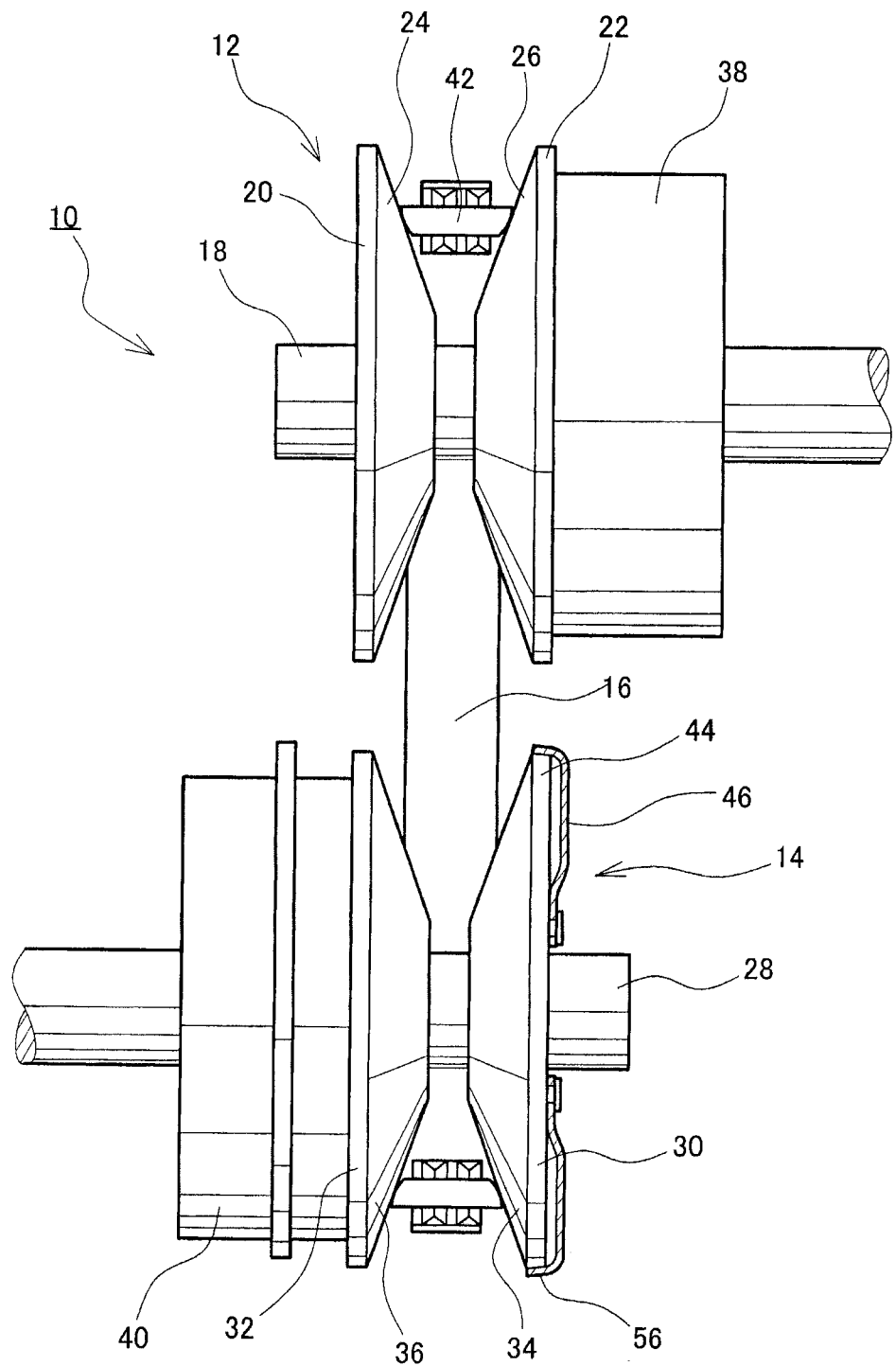
FIG. 1 is a view illustrating the configuration of a speed change mechanism of a chain-type continuously variable transmission.

Hereinafter, an embodiment of the invention will be described with reference to the accompanying drawings. FIG. 1 illustrates the configuration of a speed change mechanism of a continuously variable transmission 10 in which an endless flexible member is used. The continuously variable transmission 10 includes two pulleys 12, 14 and a chain 16, which may function as the endless flexible member, looped over the two pulleys 12, 14. Among the two pulleys 12, 14, the pulley 12 will be referred to as "input pulley 12", and the pulley 14 will be referred to as "output pulley 14". The input pulley 12 includes a fixed sheave 20 and a movable sheave 22. The fixed sheave 20 is secured to an input shaft 18. The movable sheave 22 is allowed to move on the input shaft 18 by sliding along the input shaft 18. The face of the fixed sheave 20 and the face of the movable sheave 22, which are opposed to each other, are tapered faces, and will be referred to as "tapered faces 24, 26", respectively. The tapered faces 24, 26 define a V-shaped groove. The chain 16 is located in the V-shaped groove so as to be held at its side faces between the tapered faces 24, 26. Like the input pulley 12, the output pulley 14 includes a fixed sheave 30 secured to an output shaft 28, and a movable sheave 32 that is allowed to move on the output shaft 28 by sliding along the output shaft 28. The face of the fixed sheave 30 and the face of the movable sheave 32, which are opposed to each other, are tapered faces, and will be referred to as "tapered faces 34, 36", respectively. The tapered faces 34, 36 define a V-shaped groove. The chain 16 is located in the V-shaped groove so as to be held at its side faces between the tapered faces 34, 36.

A hydraulic actuator 38 that moves the movable sheave 22 is disposed on a face of the movable sheave 22 of the input pulley 12, the face being on the opposite side of the movable sheave 22 from the tapered face 26. Hereinafter, the face of each sheave, which is on the opposite side of the sheave from its tapered face, will be referred to as "back side" of the sheave. The movable sheave 22 is moved so as to be slid on the input shaft 18 by the hydraulic actuator 38. At this time, the movable sheave 22 rotates together with the input shaft 18 (the movable sheave 22 is not allowed to rotate relative to the input shaft 18). A hydraulic actuator 40 that moves the movable sheave 32 is disposed on the back side of the movable sheave 32 of the output pulley 14. The movable sheave 32 is moved so as to be slid on the output shaft 28 by the hydraulic actuator 40. At this time, the movable sheave 32 rotates together with the output shaft 28 (the movable sheave 32 is not allowed to rotate relative to the output shaft 28).

There is an inverse relationship in arrangement of the fixed sheave and the movable sheave between the input pulley 12 and the output pulley 14. That is, the movable sheave 22 of the input pulley 12 is located on the right side in FIG. 1, whereas the movable sheave 32 of the output pulley 14 is located on the left side in FIG. 1. When the movable sheaves 22, 32 are slid respectively by the hydraulic actuators 38, 40, the distance between the tapered faces 24, 26, which are opposed to each other, and the distance between the tapered faces 34, 36, which are opposed to each other, are varied, so that the widths of the V-shaped grooves defined by the tapered faces 24, 26, 34, 36 are varied. By varying the widths of the V-shaped grooves, the running radii of the circles of rotation of the chain 16 are varied. That is, when the movable sheave 22 (32) moves away from the fixed sheave 20 (30), the width of the V-shaped groove is increased, and thus the chain 16 moves to a deeper position within the V-shaped groove to decrease the running radius of the circle of rotation of the chain 16. On the other hand, when the movable sheave 22 (32) approaches the fixed sheave 20 (30), the width of the V-shaped groove is decreased, and thus the chain 16 moves to a shallower position within the V-shaped grooves to increase the running radius of the circle of rotation of the chain 16. Because there is an inverse relationship in a manner of varying the running radius of the circle of rotation of the chain 16 between the input pulley 12 and the output pulley 14 (when the running radius on the input pulley 12 side increases, the running radius on the output pulley 14 side decreases; whereas when the running radius of the input pulley 12 side decreases, the running radius on the output pulley 14 side increases), the chain 16 is prevented from slacking. As the movable sheaves 22, 32 slide along the input shaft 18 and the output shaft 28, respectively, the widths of the V-shaped grooves continuously vary and thus the running radii of the circles of rotation of the chain 16 continuously vary. As a result, the speed ratio, at which the power is transmitted from the input shaft 18 to the output shaft 28, continuously varies.

The chain 16 includes plate-like links arranged in the circumferential direction of the chain 16, and pins 42 that connect the links that are adjacent to each other in the circumferential direction of the chain 16. The pins 42 are arranged in the circumferential direction of the chain 16 at prescribed intervals. When the input pulley 12 and the output pulley 14 are rotated, the pins 42 are caught in the pulleys 12, 14 one after another. When the pins 42 are caught in the pulleys 12, 14, the pulleys 12, 14 receive reaction forces from the pins 42 and thus the pulleys 12, 14 are deformed. The reaction forces received from the pins 42 are turned into vibratory forces that vibrate the components of the input pulley 12 and the output pulley 14. If the frequency of the vibratory force or the high harmonic frequency coincides with the natural frequency of one of the members that constitute the input pulley 12 and the output pulley 14, in particular, the natural frequency of one of the sheaves, a resonant sound is generated. For example, the fixed sheaves 20, 30 may have a vibration mode that is around a frequency band of 3 to 5 kHz, in which the outer peripheral ends of the pulleys 12, 14 are largely vibrated in the rotation axis directions of the pulleys 12, 14. In this case, noises are emitted from the fixed sheaves 20, 30. Even if the noises are emitted from the fixed sheaves 20, 30 at an acceptable level, the vibrations may be transmitted through structural members such as the input shaft 18 or the output shaft 28 and noises may be emitted from positions other than the fixed sheaves 20, 30.

Figure 2:
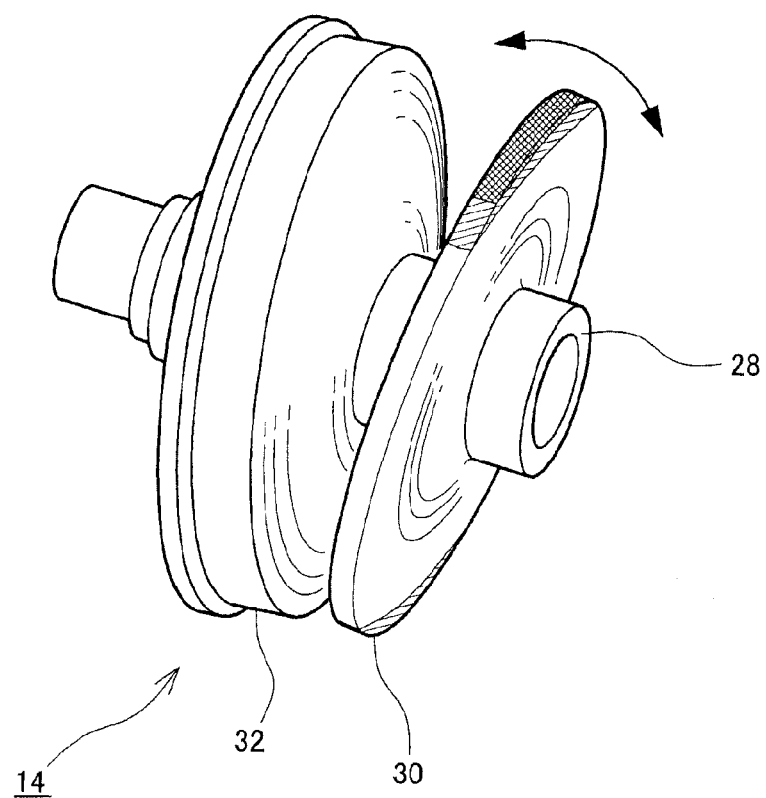
FIG. 2 is a view illustrating one of natural modes of a fixed sheave.
Figure 3:
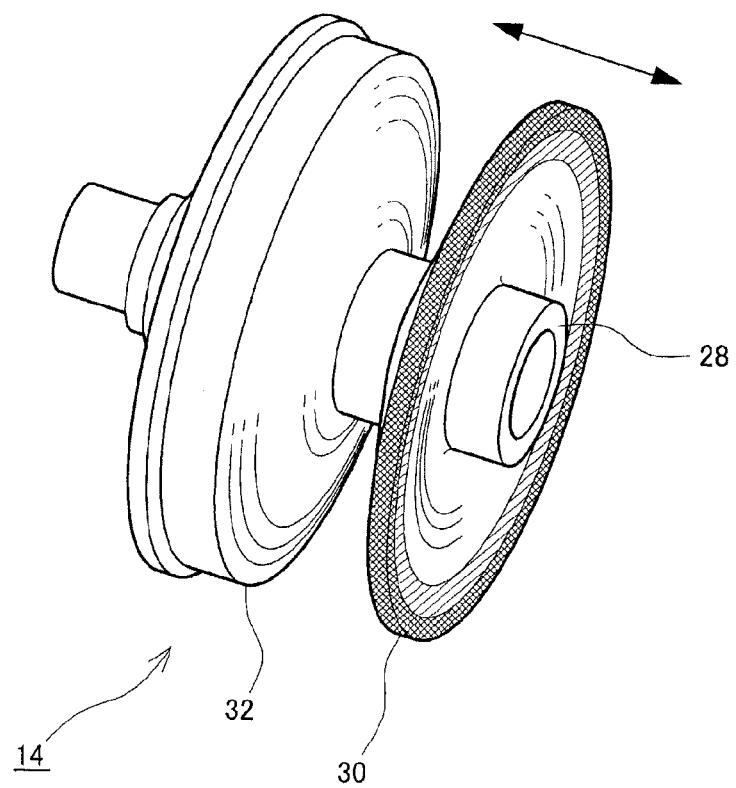
FIG. 3 is a view illustrating one of the natural modes of the fixed sheave.
Figure 4:
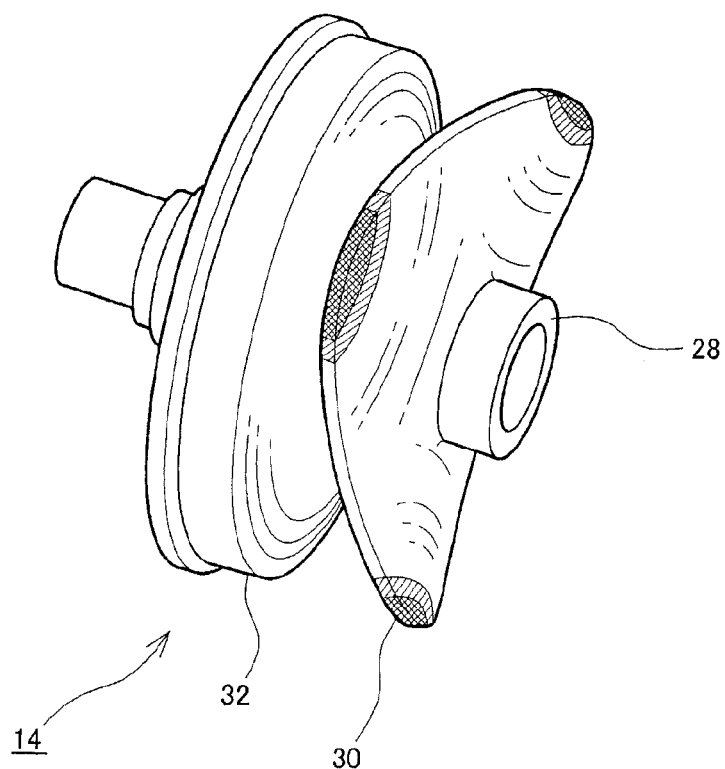
FIG. 4 is a view illustrating one of the natural modes of the fixed sheave.

FIG. 2 to FIG. 4 illustrate the natural modes of the output pulley 14, in the frequency band from 3 to 5 kHz. The natural modes of the input pulley 12 are substantially the same as those of the output pulley 14. In FIG. 2 to FIG. 4, portions in which the amplitudes of vibrations in the rotation axis direction of the output pulley 14 are large are indicated by the slanted lines, and portions in which the amplitudes of vibrations are larger are indicated by the cross-hatched lines. In the mode illustrated in FIG. 2, the fixed sheave 30 vibrates with its one diameter serving as a node. Thus, portions in which the amplitudes of vibrations are large are generated at two positions in the outer periphery of the fixed sheave 30. In the mode illustrated in FIG. 3, the fixed sheave 30 vibrates with small amplitudes at a portion around its center, that is, around the output shaft 28, but vibrates with large amplitudes at its entire periphery. In the mode illustrated in FIG. 4, the fixed sheave 30 vibrates with its two diameters orthogonal to each other serving as nodes, and portions in which the amplitudes of vibrations are large are generated at four positions in the outer periphery of the fixed sheave 30. Among these portions, the portions located on the opposite sides of the output shaft 28 vibrate in the same phase, but the portions located adjacent to each other in the circumferential direction of the fixed sheave 30 vibrate in the opposite phases. In any of these modes, a portion in which the amplitudes of vibrations are large is located in the outer periphery of the fixed sheave 30. In order to suppress the vibrations, it is preferable to restrain the portions in which the amplitudes of vibrations are large.

In order to suppress the noises generated by the vibrations of the sheaves 20, 22, 30, 32 of the input pulley 12 and the output pulley 14, at least one of the sheaves 20, 22, 30, 32 may be provided with a vibration damping structure. Which of the sheaves should be provided with the vibration damping structure may be determined by selecting the sheave with which generation of the noises is effectively suppressed. In the continuously variable transmission 10, the fixed sheave 30 of the output pulley 14 is provided with a vibration damping structure. Not only the fixed sheave 30 of the output pulley 14 but also the fixed sheave 20 of the input pulley 12 may be provided with a vibration damping structure. Alternatively, only the fixed sheave 20 of the input pulley 12 may be provided with a vibration damping structure. Moreover, one of or both of the movable sheave 22 of the input pulley 12 and the movable sheave 32 of the output pulley 14 may be provided with a vibration damping structure. In an example described below, the fixed sheave 30 of the output pulley 14 is provided with a vibration damping structure. Specifically, the vibration damping structure includes an outer peripheral face 44 of the fixed sheave 30 and a vibration damping member 46 that is in contact with the outer peripheral face 44.

Figure 5:
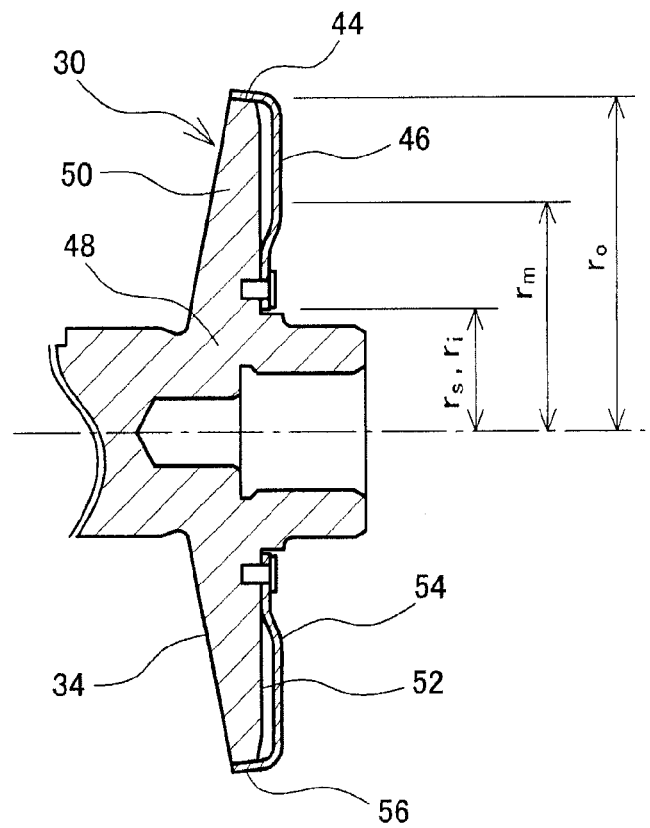
FIG. 5 is a sectional view of the fixed sheave.
Figure 6:
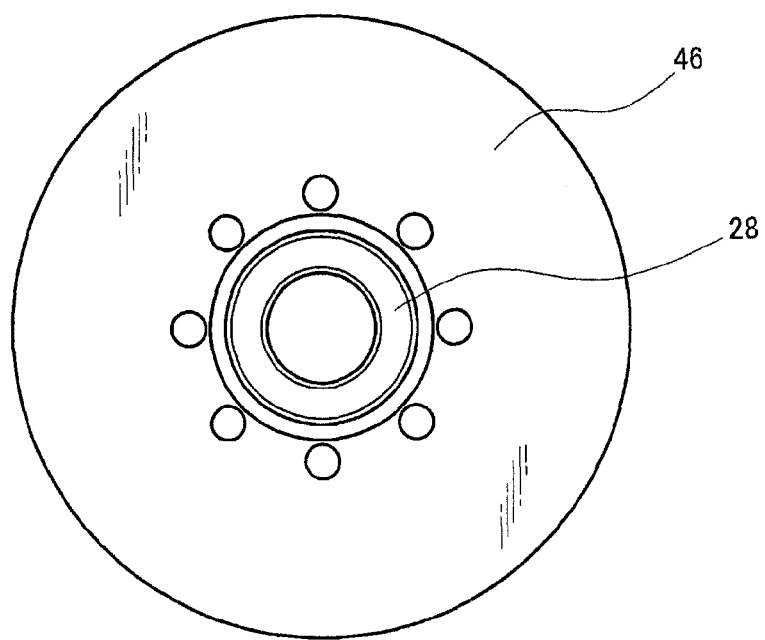
FIG. 6 is a view illustrating the fixed sheave as viewed from the back side thereof.

FIG. 5 and FIG. 6 are views that illustrate, in detail, the vibration damping structure of the fixed sheave 30. FIG. 5 is a sectional view including the rotation axis of the fixed sheave 30. FIG. 6 is a view that illustrates the fixed sheave 30 as viewed from the right side in FIG. 5. The vibration damping member 46 has an annular plate-like shape as a whole, and has a large opening at its center. Hereinafter, the vibration damping member 46 will be referred to as "vibration damping plate 46". The fixed sheave 30 is formed integrally with the output shaft 28. A portion of the fixed sheave 30, which is located within the maximum diameter $r_s$ of the output shaft 28, will be hereinafter referred to as "sheave shaft portion 48", whereas a portion of the fixed sheave 30, which is located outside the maximum diameter $r_s$ of the output shaft 28, will be hereinafter referred to as "sheave disc portion 50. The outer peripheral face 44 of the fixed sheave 30 is tapered so as to be reduced in diameter toward the back side of the fixed sheave 30.

The vibration damping plate 46 is secured to a radially inner portion of a back side 52 of the sheave disc portion 50, more specifically, to a portion adjacent to the output shaft 28. The vibration damping plate 46 may be fixed to the radially inner portion of the back side 52 with the use of fastening elements such as bolts. The vibration damping plate 46 is in contact with the back side 52 of the fixed sheave 30, at portions near the fastening elements, but is apart from the back side 52 of the fixed sheave 30, at portions apart from the fastening elements outward in the radial direction of the output pulley 14. A portion of the vibration damping plate 46, which is opposed to the back side 52, is a disc-shaped portion with a slight step. Outside the disc-shaped portion (hereinafter, referred to as "disc portion 54"), there is formed a peripheral edge portion 56 that is opposed to and in contact with the outer peripheral face 44 of the fixed sheave 30. The peripheral edge portion 56 is extended from the outer edge of the disc portion 54 in a direction parallel to the rotation axis of the output pulley 14 so as to be shaped like the edge of a dish. The peripheral edge portion 56 has an annular shape so as to surround the fixed sheave 30, and at least part of the inner peripheral face of peripheral edge portion 56 in an annular shape is in contact with the outer peripheral face 44. The peripheral edge portion 56 may be in contact with the outer peripheral face 44 at multiple positions that surround the fixed sheave 30, or at the entire inner periphery of the peripheral edge portion 56. The peripheral edge portion 56 may be tapered so as to conform to the tapered shape of the outer peripheral face 44. In this case, the outer peripheral face 44 and the peripheral edge portion 56 are in contact with each other at a strip-shaped region that extends in the circumferential direction of the fixed sheave 30.

The peripheral edge portion 56 of the vibration damping plate 46 is in contact with the outer peripheral face 44 of the fixed sheave 30 in a state where a prescribed contact pressure is applied to the outer peripheral face 44, that is, the peripheral edge portion 56 is in contact with the outer peripheral face 44 under pressure. Preferably, the contact pressure is generated in a static state. However, the contact pressure may be generated in a dynamic state, that is, the contact pressure may be generated when the fixed sheave 30 is vibrating. The contact pressure may be generated by an elastic force of the vibration damping plate 46 itself. In order to generate the contact pressure in the static state, the vibration damping plate 46 is secured to the fixed sheave 30 with the vibration damping plate 46 being elastically deformed. The contact pressure is generated, as a reaction force caused by the elastic deformation, and acts on the outer peripheral face 44.

When the fixed sheave 30 vibrates in the natural modes as illustrated in FIG. 2 to FIG. 4, a portion in which the amplitudes of vibrations are large is generated in the outer periphery of the fixed sheave 30. When the outer periphery of the fixed sheave 30 vibrates, the portion with large amplitudes of vibrations and the peripheral edge portion 56 of the vibration damping plate 46, which is in contact with this portion, move relative to each other, so that friction is generated therebetween. The friction force generated at this time acts to restrain the vibrations of the outer periphery of the fixed sheave 30. Because the vibration damping plate 46 is in contact with the portion of the fixed sheave 30 with large amplitudes of vibrations, a large damping effect is obtained.

Further, because the outer peripheral face 44 of the fixed sheave 30 is tapered, the contact pressure between the outer peripheral face 44 and the peripheral edge portion 56 is increased when the outer peripheral face 44 is moved in a direction toward the vibration damping plate 46 (rightward in FIG. 5). Thus, the friction force is increased, and it is therefore possible to obtain a large damping effect. Further, because the peripheral edge portion 56 of the vibration damping plate 46 has an annular shape, the peripheral edge portion 56 is restrained from moving so as to be broadened outward in the radial direction of the output pulley 14 when the outer peripheral face 44 is moved toward the peripheral edge portion 56. As a result, it is possible to increase the contact pressure more effectively.

In order to increase the amount of relative movement between the peripheral edge portion 56 of the vibration damping plate 46 and the outer periphery of the fixed sheave 30, it is preferable to secure the vibration damping plate 46 to a portion of the fixed sheave 30, in which the amplitudes of vibrations in the rotation axis of the output pulley 14 are small. For example, the vibration damping plate 46 may be secured to the output shaft 28. If the vibration damping plate 46 is secured to the sheave disc portion 50 of the fixed sheave 30, it is preferable to secure the vibration damping plate 46 to a portion located as inside as possible in the radial direction. For example, the vibration damping plate 46 may be secured to the fixed sheave 30 at a position radially inward of a portion having a radius that coincides with the mean radius $r_m$ ($=(r_i+r_o)/2$). The mean radius $r_m$ is the mean value of the inner radius $r_i$ ($=r_s$) and the outer radius $r_o$ of the sheave disc portion 50.

Figure 7:
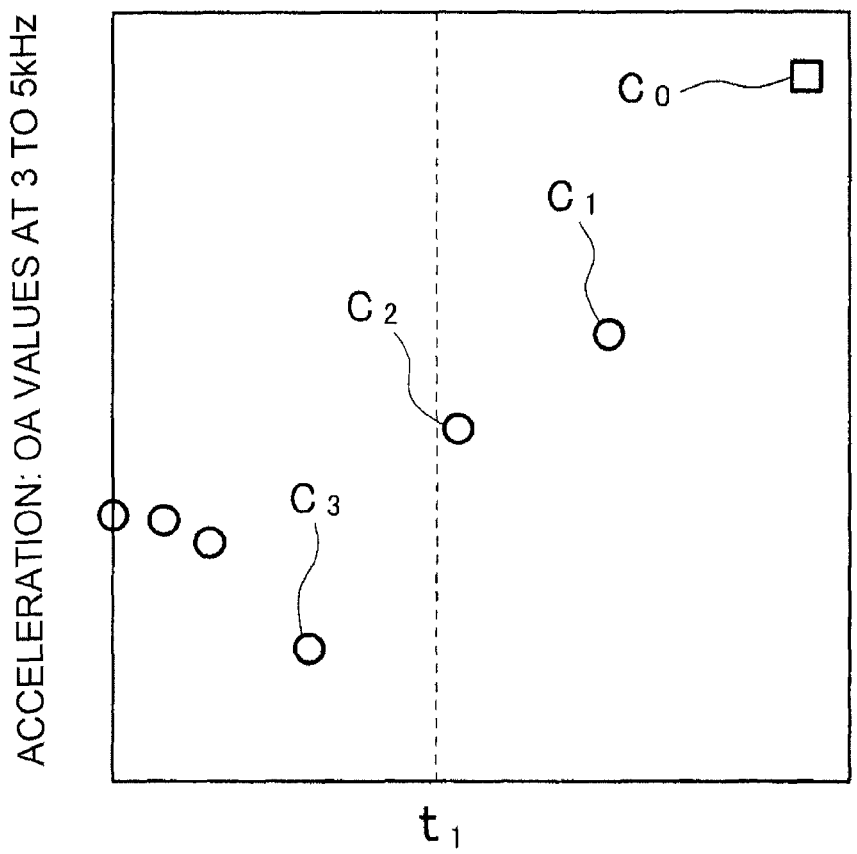
FIG. 7 is a graph illustrating the result of measurement obtained when the contact pressure of a vibration damping plate is varied.
Figure 8:
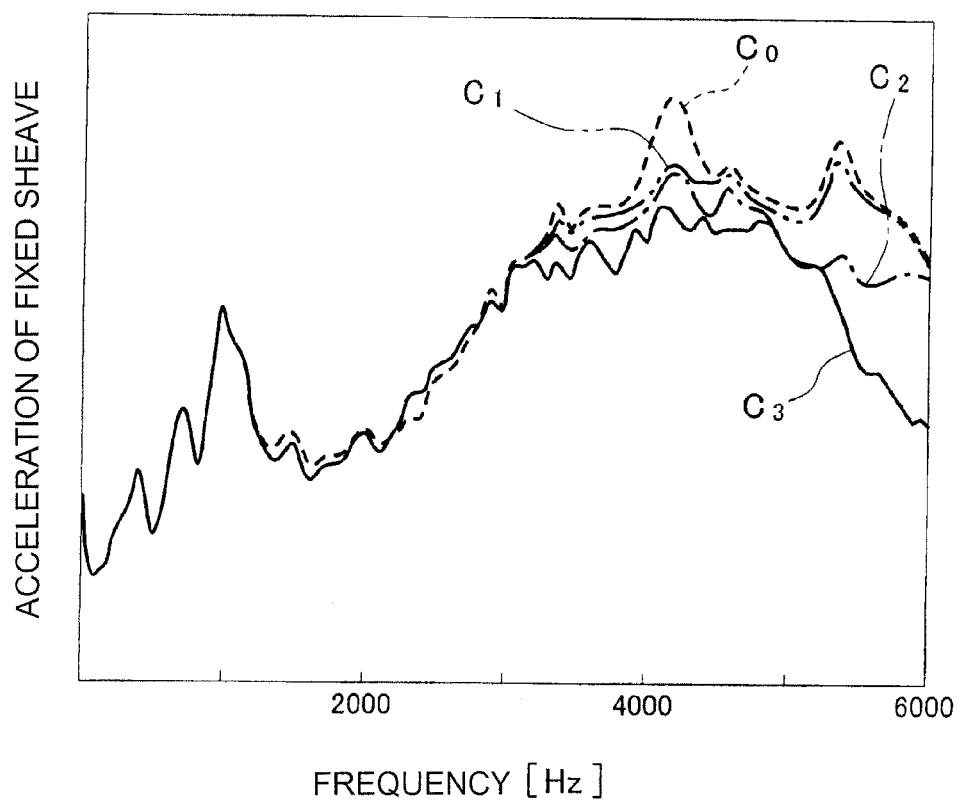
FIG. 8 is a graph illustrating the result of measurement obtained when the contact pressure of the vibration damping plate is varied.

FIG. 7 and FIG. 8 are graphs illustrating measurement results of the vibrations of the fixed sheave 30 obtained when the state of contact between the fixed sheave 30 and the vibration damping plate 46 was varied. The contact state was varied in accordance with the thickness of a shim inserted between the fixed sheave 30 and the vibration damping plate 46. The vibration damping plate 46 moves away from the fixed sheave 30 if a thick shim is inserted therebetween, whereas the vibration damping plate 46 approaches the fixed sheave 30 when the shim is changed to a thinner shim. Because the outer peripheral face 44 of the fixed sheave 30 is tapered, the contact pressure between the fixed sheave 30 and the vibration damping plate 46 is adjusted by adjusting the position of the vibration damping plate 46 with the use of the shim. The vibration acceleration of the outer edge of the fixed sheave 30 in the direction of the rotation axis of the output pulley 14 was measured. FIG. 7 illustrates overall (OA) values of the vibration acceleration in a range from 3 to 5 kHz. FIG. 8 illustrates a frequency distribution.

In FIG. 7, when the shim thickness is t1, the contact is made with the contact pressure of zero in a static state in which the fixed sheave 30 is not rotating. A point $C_0$ indicates a result of measurement when no vibration damping plate 46 is provided. Points $C_1$ to $C_3$ indicate results of measurements performed as the contact pressure is adjusted by inserting a shim between the vibration damping plate 46 and the fixed sheave 30. The point $C_2$ indicates the condition under which the contact pressure becomes substantially zero in the static state. FIG. 8 illustrates graphs corresponding to the results of measurements illustrated in FIG. 7. The graph indicated by the dashed line indicates a result of measurement when no vibration damping plate 46 is provided. The graph indicated by the long dashed double-short dashed line corresponds to the measurement condition at the contact point $C_1$ illustrated in FIG. 7, and the alternate long and short dash line corresponds to that at the contact point $C_2$, and the continuous line corresponds to that at the point $C_3$.

As understood from FIG. 7 and FIG. 8, the vibration damping effect becomes highest under the condition where the contact pressure is applied to some extent in the static state (point $C_3$). Even if the contact is not made in the static state (the point $C_1$), the vibration damping effect is obtained to some extent. It is considered that, this is because the fixed sheave 30 vibrates in the dynamic condition, and the vibration of the fixed sheave 30 causes the outer peripheral face 44 of the fixed sheave 30 to make contact with the peripheral edge portion 56 of the vibration damping plate 46. As illustrated in FIG. 7, in view of the fact that the vibration damping effect is decreased in the order of the points $C_2$, $C_1$, $C_0$, it can be understood that the vibration damping effect is caused by the friction between the fixed sheave 30 and the vibration damping plate 46, not by the mounted vibration damping plate 46 itself.

Because at least one of the outer peripheral face 44 of the fixed sheave 30 and the peripheral edge portion 56 of the vibration damping plate 46 is tapered, the contact pressure is easily adjusted by adjusting the distance between the fixed sheave 30 and the vibration damping plate 46 with the use of the shims. The disc portion 54 of the vibration damping plate 46 may be replaced with a plurality of plate-like members that extend in the radial direction, and the peripheral edge portion 56 may be supported by the plate-like members. Ribs or protrusions may be formed at the peripheral edge portion 56 of the vibration damping plate 46, at multiple positions in the circumferential direction, and the vibration damping plate 46 may be in contact with the outer peripheral face 44 of the fixed sheave 30 at the distal ends of the ribs or the protrusions.

The vibration damping member 46 is made into contact with the outer peripheral face 44 of the fixed sheave 30, which is vibrated with a large amplitude. Thus, it is possible to effectively apply a friction force.

What is claimed is:

1. A continuously variable transmission including two pulleys each having a rotary shaft and a pair of sheaves, each sheave having a side face and a tapered face so that two tapered faces are opposed to each other to define a V-shaped groove, and an endless flexible member looped over the two pulleys, the continuously variable transmission varying a transmission ratio between the pulleys by varying a distance between the sheaves in each pair, the continuously variable transmission comprising:
a vibration damping member that is in contact, under pressure, with an outer peripheral face of the sheave to which the vibration damping member is fitted, the outer peripheral face extending from one end of the side face such that the outer peripheral face is located outside of the side face in a radial direction, the side face extending in a direction substantially parallel to the radial direction,
wherein at least one of the sheaves is provided with the vibration damping member.

2. The continuously variable transmission according to claim 1, wherein the vibration damping member is in contact with the sheave at multiple positions located so as to surround the sheave, or at an entire inner periphery of the vibration damping member.

3. The continuously variable transmission according to claim 1, wherein the outer peripheral face of the sheave, with which the vibration damping member is in contact, is tapered.

4. The continuously variable transmission according to claim 2, wherein the outer peripheral face of the sheave, with which the vibration damping member is in contact, is tapered.

5. The continuously variable transmission according to claim 1, wherein:
the vibration damping member has an annular portion that is located so as to be opposed to the outer peripheral face of the sheave; and
at least part of the annular portion is in contact with the outer peripheral face of the sheave under pressure.

6. The continuously variable transmission according to claim 2, wherein:
the vibration damping member has an annular portion that is located so as to be opposed to the outer peripheral face of the sheave; and
at least part of the annular portion is in contact with the outer peripheral face of the sheave under pressure.

7. The continuously variable transmission according to claim 3, wherein:
the vibration damping member has an annular portion that is located so as to be opposed to the outer peripheral face of the sheave; and
at least part of the annular portion is in contact with the outer peripheral face of the sheave under pressure.

8. The continuously variable transmission according to claim 4, wherein:
the vibration damping member has an annular portion that is located so as to be opposed to the outer peripheral face of the sheave; and
at least part of the annular portion is in contact with the outer peripheral face of the sheave under pressure.

9. The continuously variable transmission according to claim 1, wherein:
one of the sheaves in each pair is fixed to the rotary shaft of the corresponding pulley and the other one of the sheaves in the pair is movable relative to the rotary shaft; and
the vibration damping member is fixed to the sheave that is fixed to the rotary shaft, the vibration damping member being fixed at a position radially inward of a portion of a disc portion of the sheave fixed to the rotary shaft, a radius of the portion coinciding with a mean radius of the disc portion.

10. The continuously variable transmission according to claim 2, wherein:
one of the sheaves in each pair is fixed to the rotary shaft of the corresponding pulley and the other one of the sheaves in the pair is movable relative to the rotary shaft; and
the vibration damping member is fixed to the sheave that is fixed to the rotary shaft, the vibration damping member being fixed at a position radially inward of a portion of a disc portion of the sheave fixed to the rotary shaft, a radius of the portion coinciding with a mean radius of the disc portion.

11. The continuously variable transmission according to claim 3, wherein:

one of the sheaves in each pair is fixed to the rotary shaft of the corresponding pulley and the other one of the sheaves in the pair is movable relative to the rotary shaft; and the vibration damping member is fixed to the sheave that is fixed to the rotary shaft, the vibration damping member being fixed at a position radially inward of a portion of a disc portion of the sheave fixed to the rotary shaft, a radius of the portion coinciding with a mean radius of the disc portion.

12. The continuously variable transmission according to claim 4, wherein:

one of the sheaves in each pair is fixed to the rotary shaft of the corresponding pulley and the other one of the sheaves in the pair is movable relative to the rotary shaft; and the vibration damping member is fixed to the sheave that is fixed to the rotary shaft, the vibration damping member being fixed at a position radially inward of a portion of a disc portion of the sheave fixed to the rotary shaft, a radius of the portion coinciding with a mean radius of the disc portion.

13. The continuously variable transmission according to claim 5, wherein:

one of the sheaves in each pair is fixed to the rotary shaft of the corresponding pulley and the other one of the sheaves in the pair is movable relative to the rotary shaft; and the vibration damping member is fixed to the sheave that is fixed to the rotary shaft, the vibration damping member being fixed at a position radially inward of a portion of a disc portion of the sheave fixed to the rotary shaft, a radius of the portion coinciding with a mean radius of the disc portion.

14. The continuously variable transmission according to claim 6, wherein:

one of the sheaves in each pair is fixed to the rotary shaft of the corresponding pulley and the other one of the sheaves in the pair is movable relative to the rotary shaft; and the vibration damping member is fixed to the sheave that is fixed to the rotary shaft, the vibration damping member being fixed at a position radially inward of a portion of a disc portion of the sheave fixed to the rotary shaft, a radius of the portion coinciding with a mean radius of the disc portion.

15. The continuously variable transmission according to claim 7, wherein:

one of the sheaves in each pair is fixed to the rotary shaft of the corresponding pulley and the other one of the sheaves in the pair is movable relative to the rotary shaft; and the vibration damping member is fixed to the sheave that is fixed to the rotary shaft, the vibration damping member being fixed at a position radially inward of a portion of a disc portion of the sheave fixed to the rotary shaft, a radius of the portion coinciding with a mean radius of the disc portion.

16. The continuously variable transmission according to claim 8, wherein:

one of the sheaves in each pair is fixed to the rotary shaft of the corresponding pulley and the other one of the sheaves in the pair is movable relative to the rotary shaft; and the vibration damping member is fixed to the sheave that is fixed to the rotary shaft, the vibration damping member being fixed at a position radially inward of a portion of a disc portion of the sheave fixed to the rotary shaft, a radius of the portion coinciding with a mean radius of the disc portion.

\* \* \* \* \*